Figure 9:
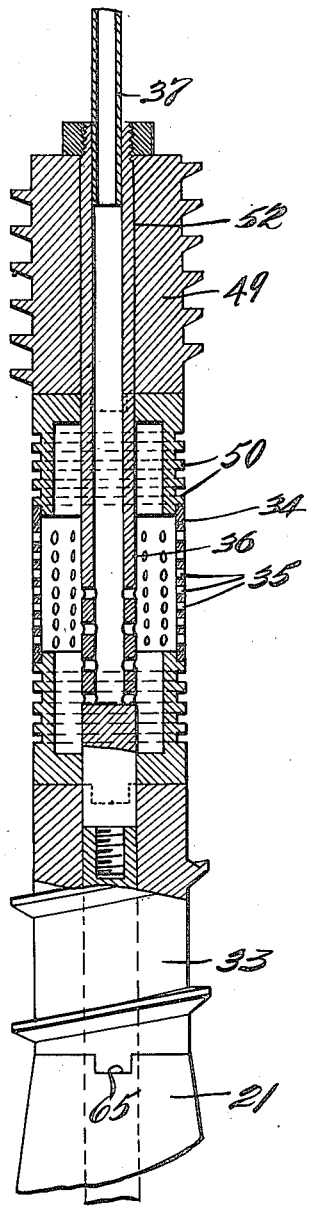

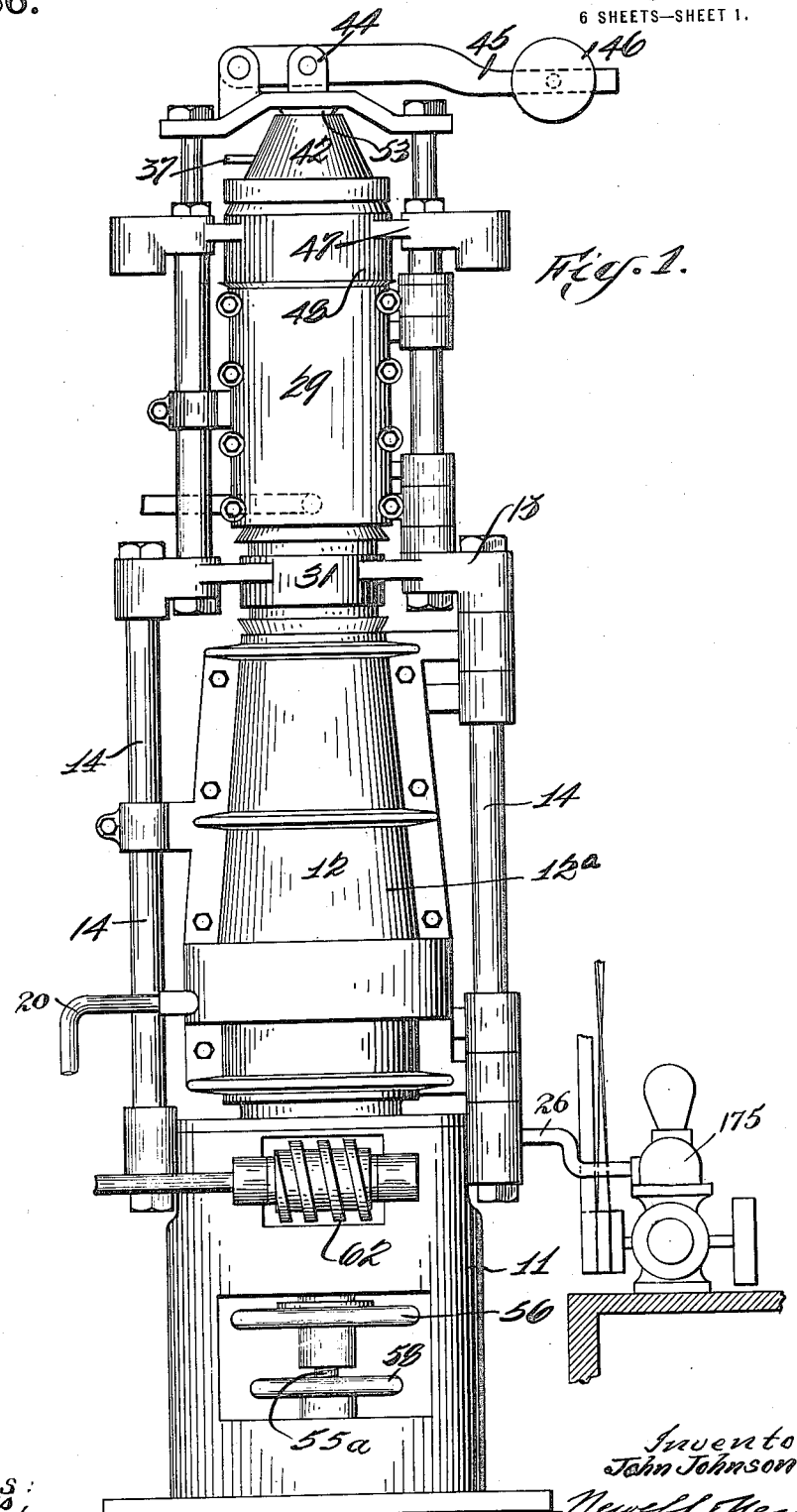

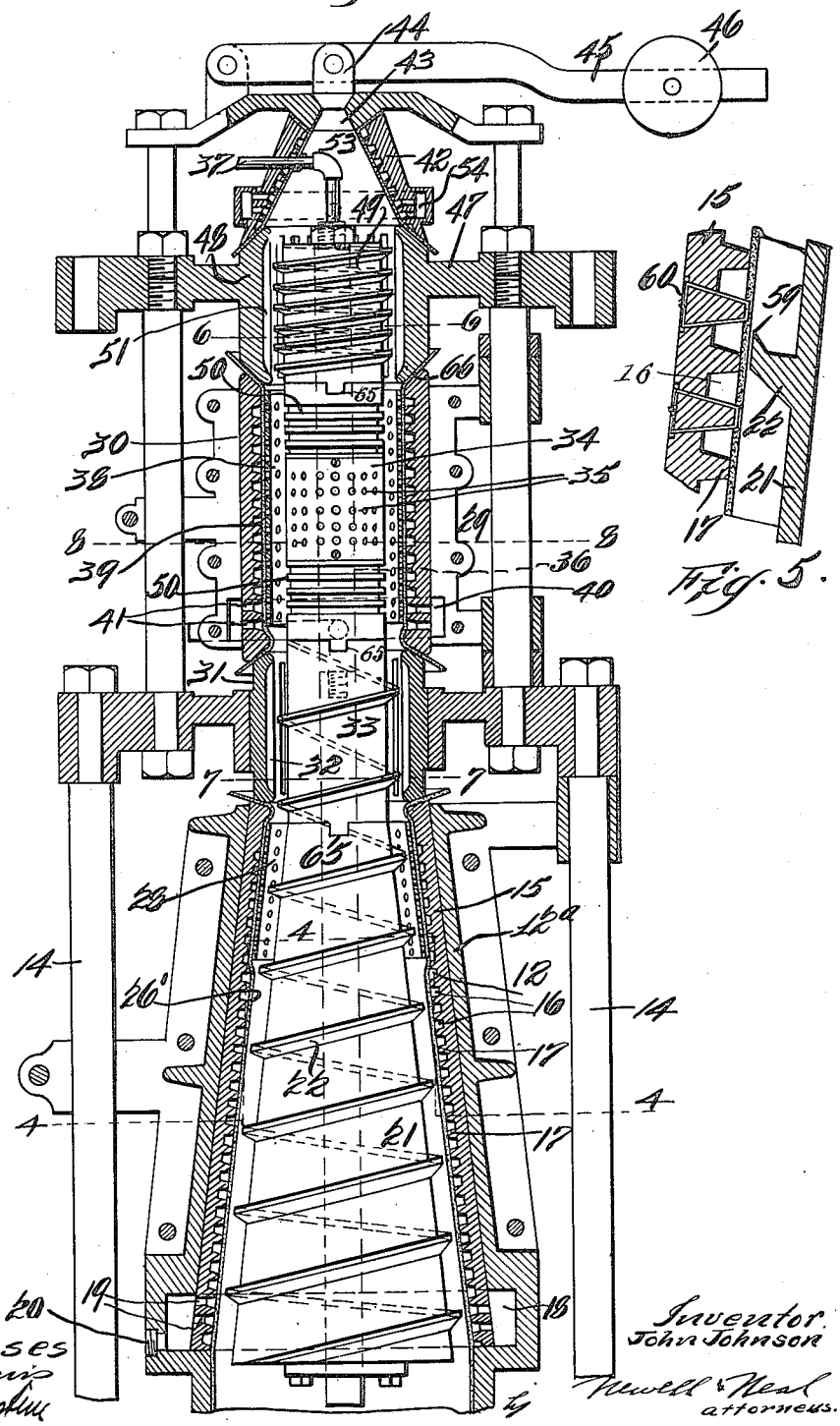

J. JOHNSON.
FILTER PRESS.
APPLICATION FILED NOV. 7, 1913.
1,151,186.
Patented Aug. 24, 1915.
6 SHEETS—SHEET 3.
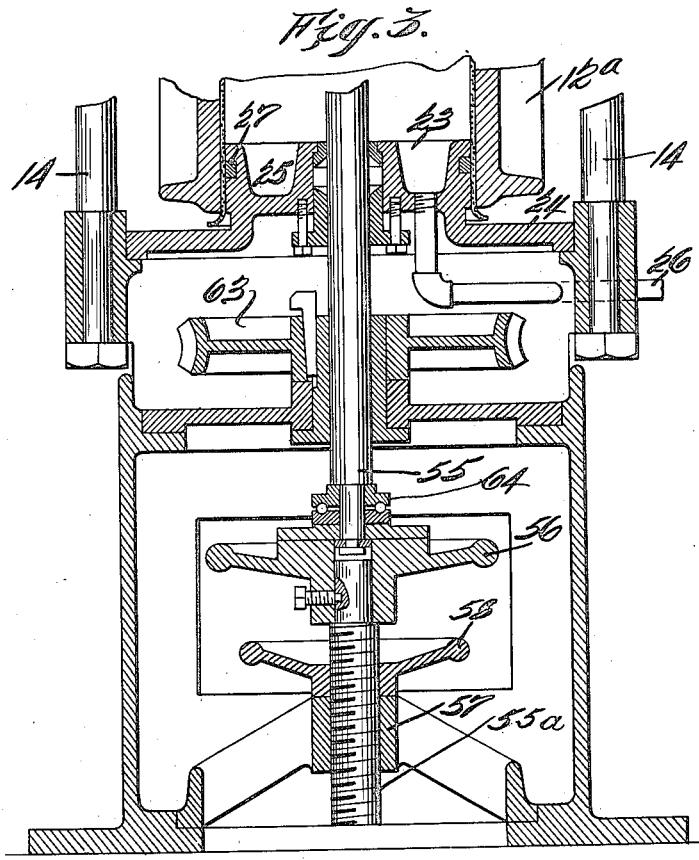
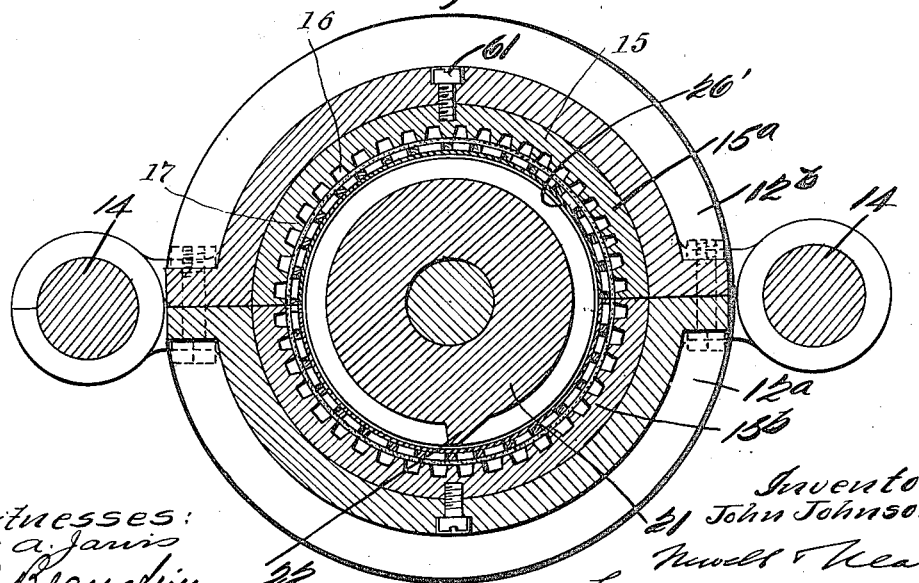

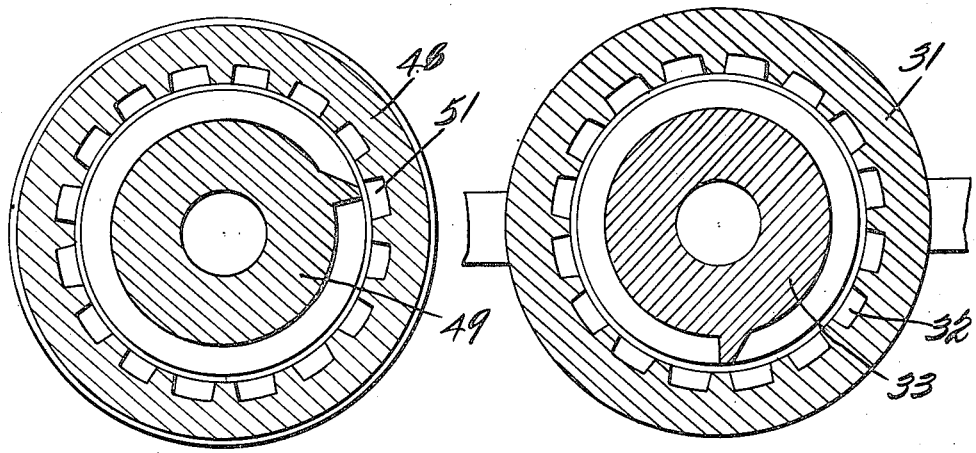
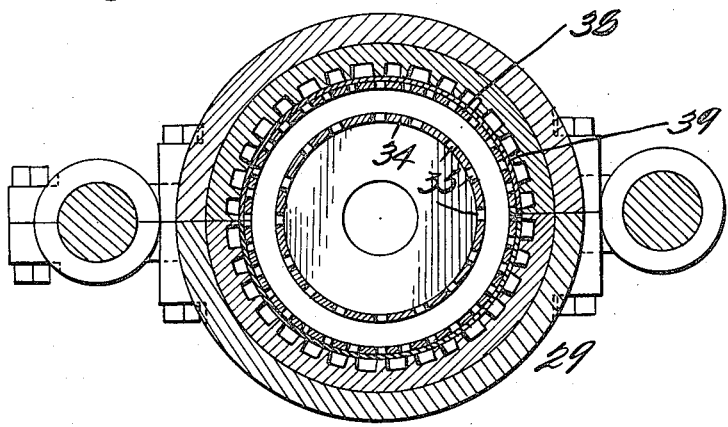

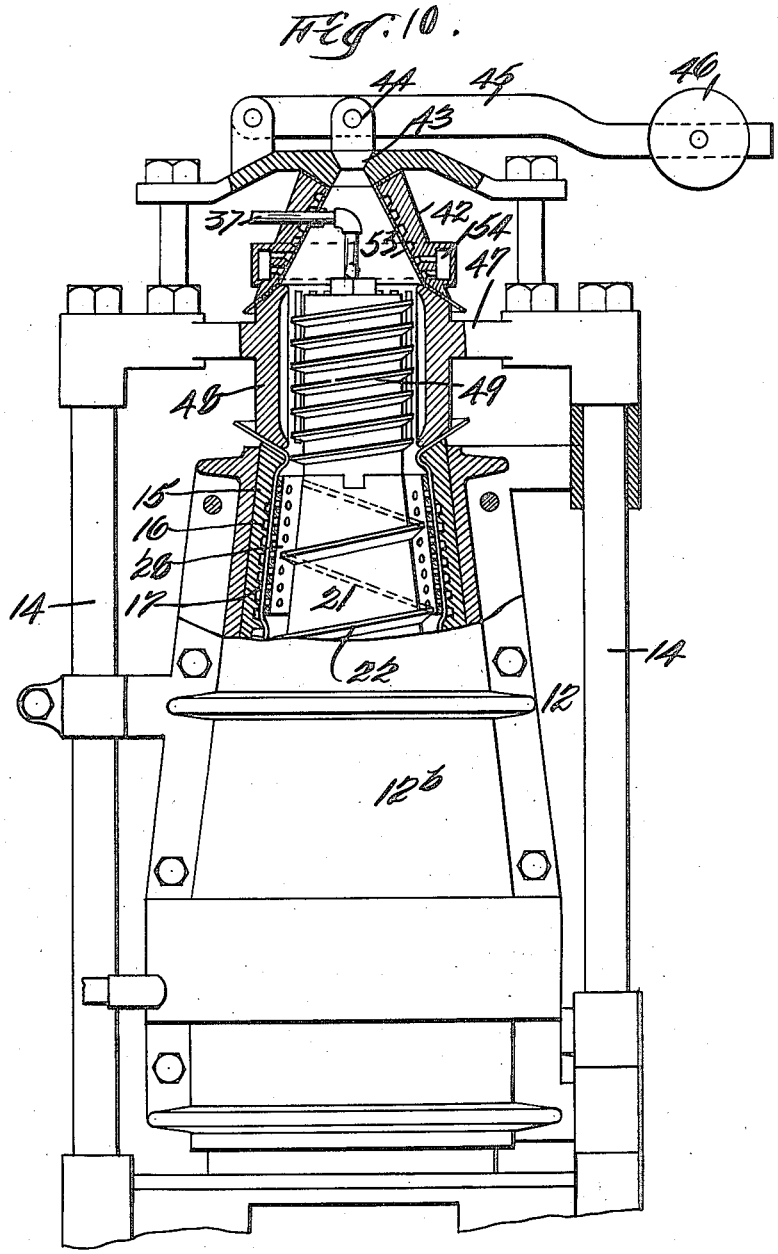

UNITED STATES PATENT OFFICE.

JOHN JOHNSON, OF BROOKLYN, NEW YORK.

FILTER-PRESS.

1,151,186.　　　　　Specification of Letters Patent.　　Patented Aug. 24, 1915.

Application filed November 7, 1913. Serial No. 799,669.

*To all whom it may concern:*

Be it known that I, JOHN JOHNSON, a citizen of the United States, residing at Brooklyn, New York, have invented certain new and useful Improvements in Filter-Presses, of which the following is a clear, full, and exact description.

This invention relates to filter presses, and particularly to the type of such filters which subject the substance filtered to a high degree of pressure.

A principal object of the invention is to enable the filter press to operate continuously and without necessitating the cessation of the filtering during the discharge of the waste substance.

A further object is to provide an arrangement whereby in the operation of the filter a layer of the substance being filtered will be formed within the press and in such a way that it will operate to assist the operation of the filtering medium. In the preferred embodiment of the invention, arrangement is made for removing this deposited layer and for washing it or treating it thereafter to extract substances in the layer.

A further object of the invention is to provide for performing the filtering operation in stages, and for treating the substance being filtered in any desired manner between the stages of filtration.

Other objects of the invention will appear hereinafter in the description.

In the preferred embodiment of my invention illustrated in the drawings, Figure 1 is a side elevation showing a filter press having my inprovements; Fig. 2 is a vertical section taken through the upper portion of the press shown in Fig. 1; Fig. 3 is a vertical central section taken through the base portion of the press shown in Fig. 1; Fig. 4 is a horizontal cross-section taken on the broken line 4—4—4 of Fig. 2; Fig. 5 is a detail showing in section a portion of the filtering medium and other features; Fig. 6 is a horizontal cross-section of the filter taken on the line 6—6 of Fig. 2; Fig. 7 is a horizontal cross-section taken on the line 7—7 of Fig. 2; Fig. 8 is a cross-section on the line 8—8 of Fig. 2; Fig. 9 is a vertical section through the apparatus enabling the filtered substance to be treated in any special manner as it passes through the filter; and Fig. 10 is a side elevation and partial section showing a modified arrangement for filtering the substance in stages without giving the substance any treatment between the stages.

Referring more particularly to the drawings, the filter-press as a whole is made up with a chamber extending longitudinally therethrough, as shown more particularly in section in Fig. 2, said chamber comprising a number of compartments in which different stages of the continuous filtering process take place. For instance, in the lowermost or filtering compartment 21, preferably in tapered form, the main part of the filtering operation takes place. The walls of this compartment are lined with filtering material 26' and the material to be filtered is forced into this compartment under pressure through an inlet 26 (see Fig. 1) from a suitable force pump 175, so that the filtrate is forced through the filtering medium 26' leaving a deposit of residuum upon said filtering medium as is well understood. The next compartment 33, directly above the filtering compartment 21, is simply a discharging compartment through which material is conveyed from the filtering compartment 21 into a washing compartment 29 hereinafter more particularly described. Above the washing compartment is another discharging compartment formed within sleeve 48. Above this discharging compartment is a packing compartment formed within a conically shaped upper casing 42. The several features of these various compartments and the operations which take place therein will be more particularly described hereinafter.

In the preferred embodiment of the invention illustrated, 11 represents a base which supports the casing of the press, said casing being preferably in separate parts, the base section 12 being disposed between the base 11 and an upper cross head 13. The cross head 13 may be connected with the base 11 by vertical tie bars 14. Part 12 of the casing is preferably of substantially conical form, as shown in Fig. 2, and it is preferably formed in two separable segments 12ᵃ and 12ᵇ, that is, it is divided on its longitudinal axis so as to enable it to be opened to give access to the interior. Within the casing 12 I prefer to provide a liner 15, the inner face of the wall of which is provided with ducts 16 for carrying off the filtrate. The effect of ducts 16 is preferably produced by forming the inner face of the wall of the casing with pyramidal projections or studs 17. The base of the liner 15 may rest in a chamber 18, and at this chamber openings 19 may be formed through the liner so as to permit the filtrate to pass into the chamber, and thence through an outlet or drain 20. Within the part 12 I provide means for advancing and compressing the substance filtered, preferably in the form of a rotary conveyer 21, which may have a conical body as shown, with a worm or thread 22 of helical form passing from one end to the other, so that when rotated in the proper direction it will advance the sludge or substance being filtered in an upward direction, that is, toward the small end of the press.

Referring especially to Fig. 3, I prefer to let the lower end of the part 12 seat over a hub 23 which is formed on a suitable base 24, and this hub may form a basin 25 into which the material to be filtered is continuously pumped through inlet pipe 26 from the pump 175. The screw conveyer 21 gathers the material in this basin 25 and conveys it upwardly through the apparatus. Between the conveyer 21 and the wall of the casing, I prefer to provide a filtering medium 26' of cloth or any suitable material, which lies close against the studded face of the liner, and the lower end of this filtering medium may extend down between the hub 23 and the lower end of the case 12, as shown in Fig. 3. At this point the hub 23 may be provided with a suitable packing ring 27 to prevent the escape of filtrate between the case and the hub. In the small end of the casing 12 the substance being filtered may become greatly compressed and sufficiently hard to endanger the filtering medium, and in order to protect the medium at this point I may employ a protecting sleeve 28, which may be perforated as shown.

It is understood that as the conveyer 21 is rotated, the substance will pass on, and in order to enable the substance to be treated after the first stage of filtration and compression which has taken place in the part 12, I prefer to employ a washer 29. This washer is preferably in the form of a tubular case 30, the lower end of which is connected with the upper end of the case 12 by guide sleeve or thimble 31. In order to prevent rotation of the substance as it passes from the lower case 12 into the case 30, I may provide the inner face of the wall of the sleeve 31 with longitudinal corrugations or grooves 32; and in this sleeve I may provide a short section 33 of a screw-conveyer, the body of which is preferably cylindrical as shown. This short screw-conveyer 33 may be seated on the upper end of the conveyer 21, so that it is rotated thereby.

Within the case 30 may be provided a core 34, which is preferably of tubular form having its middle portion provided with perforations 35, and arranged with a hollow shaft 36 (Fig. 9) to enable a fluid of any kind to be admitted. This fluid may enter by a pipe 37 near the outlet of the press, which has an extension coaxial with the hollow shaft 36 and extending into it. The case 30 is also preferably formed in detachable segments, and on the interior is preferably provided with a liner 38 in the form of a perforated sleeve, and between this sleeve and the wall of the case 30 a filtering medium 39 may be provided. This filtering medium may be, if desired, the same as the filtering medium used in connection with the lower case 12, and the inner face of the wall of the case 30 is constructed so as to conduct off any fluid passing through the device, the same being arranged to collect in the chamber 40 from which it drains; and the case 30 may be provided with openings 41 opening communication with this chamber. With the arrangement of the case 30 and the core 34, it will be evident that an annular passageway is formed through which the substance must pass, and by the arrangement suggested I am enabled to treat this substance at this point in any manner desired and as may be required by various industrial processes. For instance I may, instead of forcing water through the substance, force steam, air or any other fluid desired. The substance may pass from the washer or special device 29 so as to be recompressed and refiltered. In other words, the filtering may be effected in two stages between which the substance may be washed or treated chemically, or otherwise.

It is understood that on account of the tapered form of the lower case 12 and the consequent progressive reduction of the area of the passageway for the substance, a very considerable compression results, bringing about an efficient removal of the moisture or liquid in the substance being treated.

I prefer to effect the second stage of compression and filtration by means of an upper casing 42, which may be of conical form as shown. The upper portion of this casing 42 is formed with an outlet 43 normally closed, or partially closed, by a plug 44, and this plug is preferably yieldingly held in place by means of a lever 45 carrying an adjustable weight 46. The tapered form of the casing 42 together with the weighted plug closure 44 provide means for choking the outlet 43 so that the solid residuum from the filtering operations in the chambers below even though it may itself be forced upwardly through the outlet 43, will nevertheless so close the opening as to maintain the pressure within the chamber. By this choking action, the solid residual portions of the material being filtered is allowed to pass continuously out of the apparatus without, however, permitting any of the less filtered or unfiltered portions from being blown out through the top of the chamber, due to the pressure therein. The lower end of this upper case 42 may seat on a cross-head 47 which connects with the washer or special device 29 by means of a sleeve 48, which may be similar to the sleeve 31, but formed integral with the head. Within the sleeve 48 I may provide an upper screw-conveyer 49, the thread of which is preferably of low pitch, so that it does not advance the substance which it receives from the washer at as high a rate of speed as the substances are being advanced by the screw 33. By this arrangement a very high pressure can be developed in the upper case 42. On this account it will be understood that the substances passing into and out of the washer 29 are under considerable pressure, and this tends to prevent the water or other fluid which is passed through the substance at this point, from passing longitudinally and escaping at the ends. However, in order to assist in preventing such an escape of the fluid which is passed through the substance in the washer 29, I prefer to provide the wall of the core with corrugations or annular ribs 50, which form obstructions in the passageway and tend to collect the substance in a packed condition, which will prevent the escape of a fluid as suggested.

In order to prevent the substance or sludge from rotating in passing through the sleeve 48, this sleeve may be provided with longitudinal grooves or ribs 51 similar to the grooves in the sleeve 31. As shown in Fig. 9, the screw-conveyer 49 is preferably formed with a bore 52 to receive the hollow shaft 36 and to receive the vertical extension of the inlet pipe 37. The upper case 42, however, may have its inner face studded or formed in any other manner to produce ducts for carrying off the filtrate, and it may be provided with a filtering medium 53. The base of the upper case 42 may also be provided with a collecting chamber 54 for the filtrate, which may be connected with a drain.

In the preferred construction the periphery of the conveyer 21 is substantially removed from the filtering medium 26' so that a substantial layer of the substance being filtered or residuum collects on the inner side of the liner 15. This layer which deposits, increases the efficiency of the filter and in some industrial processes it may collect valuable material which might otherwise be lost. From time to time, however, it is desirable to remove this layer of deposit, and by treating it in the washer 29 materials in this deposit or cake can be reclaimed. In order to remove this cake, I provide for a longitudinal or shifting movement of the case 12 and the conveyer 21 with respect to each other. This may be accomplished as indicated in Fig. 3, by providing an adjusting screw 55$^a$ in the base 11, which enables the central shaft 55 of the conveyer to be raised by rotating the hand-wheel 56, which rotates the screw in the threaded hub 57. A check nut 58 is provided in the form of a hand-wheel for locking the adjusting screw in any adjusted position desired. When the adjusting screw is properly adjusted, the thread 22 of the conveyer can be brought close to the face of the filtering medium 26, so that when the conveyer is then rotated the thread 22 operates as a scraper to remove the cake. In order to prevent the thread from operating to compress the cake against the filtering medium in such a way as to interfere with the efficiency of the filter, I prefer to provide the thread 22 with a knife edge 59, as indicated in Fig. 5. This form for the thread not only prevents the compressing of the deposited cake, but also increases the efficiency of the screw when it is being used as a scraper.

The filtering medium in the preferred form of the invention illustrated in Fig. 5 may be attached to the liner 15 by a fastening or wire 60 passing through the wall of the liner as indicated. The liner 15 may be formed in two segments, 15$^a$ and 15$^b$, divided from each other in the same plane as the sections 12$^a$ and 12$^b$, and attached in these sections by set screws 61 as shown in Fig. 4.

The central shaft 55 of the machine may be rotated continuously by means of a worm 62 which engages a worm wheel 63 rigidly mounted on the shaft. In order to reduce the friction the shaft 55 may be stepped on a ball-bearing 64. The rotation of the conveyer 21 rotates the conveyers 33 and 49, and also the core 34, as these parts are all set end to end and with interlocking connections 65. The filtering mediums at the different points in the filter are preferably held in position by clamping their ends between seats 66 formed on the adjacent ends of the parts.

It is understood that although I have illustrated the washer or special device 29 in connection with a filter press, it is evidently capable of use independently of the other parts of the press, and if desired the press may be employed without including the washer. Furthermore the lower case 12 and the conveyer means within it, in themselves constitute a press which, if desired, could be used without the apparatus in the upper part of the press for effecting the second stage of the filtration. In Fig. 10 I have illustrated a two-stage filter press without including the washer, in which case connection is made directly between the lower case 12 and the upper case 42 through the sleeve 48. Except for the omission of the washing device, the general structure of the press shown in Fig. 10 is the same as that described above.

While I have described the washing fluid as entering through the pipe 37 and passing in an outward direction through the substance in the washer, it is obvious that the water or other fluid may be forced through the substance in the opposite direction. The apparatus may be made to operate, if desired, in connection with means for producing a pressure or a vacuum.

In the general mode of operation of the filter, the rotation of the lower conveyer 21 advances the substance and compresses it through the small end of the case 12, from which it passes on to the washer 29 where it is treated in any manner desired by passing a fluid through the substance. From this point the substance passes on to the upper case 42, where the second stage of filtration takes place. Attention is called to the fact that the conveyer screw 49 preferably tends to advance the material at a lower rate of speed, and this assists in producing a pressure at the outlet end of the filter. Instead of accomplishing this reduction in rate of advance of the material by a change of pitch of the thread, this could of course be accomplished by rotating the conveyer screws at different speeds, or by any other means. I may filter through wire gauze for a filtering medium and I may use wire gauze for sleeves 28 and 38. It is understood that the preferred form of the invention which I have described is only one of the many forms the invention may take, and I do not wish to be limited in my claims to the particular form of the invention shown.

What I claim as new is:

1. A filter press comprising a casing formed of sections connected end to end, means for advancing and compressing the substance within said casing, a filtering medium of flexible material disposed around the inner face of the wall of said casing, said sections being arranged to clamp said filtering medium.

2. A filter press comprising a casing, a filtering medium disposed within said casing and adjacent the inner face of the wall thereof, a conveyer within said casing for advancing the substance within the same, the periphery of said conveyer being arranged at a slight distance from said filtering medium to permit a deposit of a substantial layer of the substance on the inner face of said medium, said casing having ducts for leading off the filtrate passing through said layer and said medium.

3. A filter press comprising a casing having a tapering bore therein, a tapering conveyer mounted in said casing and adapted to advance the substance therein, said conveyer having its periphery normally substantially removed from the inner face of the wall of said casing, and means for shifting said conveyer or said casing longitudinally with respect to each other to bring said periphery substantially into contact with the said inner face of said wall.

4. A filter press comprising a tapered casing, a tapered conveyer mounted in said casing and adapted to advance the substance therein, a filtering medium disposed against the inner face of the wall of said casing, said conveyer normally having the periphery thereof substantially removed from said filtering medium whereby a substantial layer of the substance deposits on the said medium, and means for shifting said conveyer or said casing relatively to each other to bring said periphery into substantial contact with said medium in order to remove said layer.

5. A washing device comprising a tubular casing, a tubular core mounted within said casing, means for advancing the substance to be washed between said core and said casing, means for passing a fluid between said core and said casing and through said substance, and means for preventing the escape of the fluid in the direction of the ends of said casing.

6. A washing device comprising a tubular casing, a tubular core mounted therein and arranged so that an annular space is formed between said core and said casing through which the substance to be washed may pass, means for forcing a fluid through the substance and between said casing and said core, and means projecting into the said annular space to prevent the passage of said fluid longitudinally within said casing.

7. A washing device comprising a tubular casing, a tubular core mounted therein and forming an annular passage for the substance to be washed, said core and said casing having means for conducting a fluid across said annular passage, at least one of said members having annular projections extending into said annular passage to prevent the escape of said fluid in a longitudinal direction.

8. A filter press having a wall with a studded inner face, a filtering medium lying against said inner face, and means for compressing the substance within said casing.

9. A filter press having a substantially conical casing, a screw-conveyer rotatably mounted therein and having a thread adapted to advance the substance within said casing, the periphery of said conveyer normally lying removed from the inner face of said casing, means for shifting said casing or said conveyer longitudinally with respect to each other to bring said periphery substantially against the inner face of said casing to scrape the same.

10. A filter press having a casing, a rotary conveyer mounted in said casing and adapted to advance the substance therein, said conveyer having a periphery normally substantially removed from the inner face of said casing, said periphery having a screw-thread for advancing the substance, said screw-thread having a knife edge on the forward side thereof to prevent the compression of the substance against the wall of said casing.

11. A filter press having a casing, a rotary conveyer mounted in said casing and adapted to advance the substance therein, said conveyer having a periphery normally substantially removed from the inner face of said casing, said periphery having a screw-thread for advancing the substance, said screw-thread having a knife edge on the forward side thereof to prevent the compression of the substance against the wall of said casing, and means for bringing the periphery of said thread substantially against the inner face of the wall of said casing to scrape the same.

12. A filter press having longitudinally disposed sections, means for advancing the substance longitudinally through said sections, a neck connecting said sections, a rotary conveyer passing through said neck for advancing the substance between said sections, and means for preventing the rotation of the substance in passing through said neck.

13. In a continuous filter-press in combination, a longitudinal chamber, an inlet for the material to be filtered, an outlet for the residuum thereof, a filtering medium within said chamber, means for creating a pressure in said chamber to thereby force the filtrate through said filtering medium and leave a deposit of residuum thereon, means for continually carrying forward residuum deposited on said filtering medium toward the outlet of said chamber, and means projecting into the outlet of said chamber for choking it so that the filtered residuum in passing therethrough will close the same sufficiently to maintain the pressure within said chamber.

14. In a continuous filter-press in combination, a longitudinal chamber, an inlet for the material to be filtered, an outlet for the residuum thereof, a filtering medium within said chamber, means for creating a pressure in said chamber to thereby force the filtrate through said filtering medium and leave a deposit of residuum thereon, means for continually carrying forward residuum deposited on said filtering medium toward the outlet of said chamber, constructed to effect the movement of the residuum through said chamber at a gradually decreasing speed so as to increase the compression on said residuum as it approaches said outlet opening, and means for choking the outlet of said chamber so that the filtered residuum in passing therethrough will close the same sufficiently to maintain the pressure within said chamber.

15. In a continuous filter-press in combination, a longitudinal chamber, an inlet for the material to be filtered, an outlet for the residuum thereof, a filtering medium within said chamber, means for creating a pressure in said chamber to thereby force the filtrate through said filtering medium and leave a deposit of residuum thereon, means for continually removing and carrying forward a portion of the residuum deposited on said filtering medium toward the outlet of said chamber, said means being constructed and arranged to leave some of the residuum temporarily on said filtering medium to increase the filtering action, and means for choking the outlet of said chamber so that the filtered residuum in passing therethrough will close the same sufficiently to maintain the pressure within said chamber.

16. In a continuous filter-press in combination, a longitudinal chamber, an inlet for the material to be filtered, an outlet for the residuum thereof, a filtering medium within said chamber, means for creating a pressure in said chamber to thereby force the filtrate through said filtering medium and leave a deposit of residuum thereon, means for continually removing and carrying forward a portion of the residuum deposited on said filtering medium toward the outlet of said chamber, means for choking the outlet of said chamber so that the filtered residuum in passing therethrough will close the same sufficiently to maintain the pressure within said chamber, and means for periodically causing the removal of substantially the entire deposit of residuum on said filtering medium so that a new deposit of residuum may be formed thereon.

17. In a continuous filter-press in combination, a longitudinal chamber comprising a filtering compartment and a packing compartment, said filtering compartment having an inlet for the material to be filtered, a filtering medium within said compartment, means for creating a pressure in said chamber to thereby force filtrate through said filtering medium and leave a deposit of residuum thereon, means for continually carrying forward residuum deposited on said filtering medium to said packing compartment, said packing compartment being provided with means to restrict the movement of material therethrough and having an outlet opening provided with means projecting into said opening to choke the same so that the residual material passing through said outlet will close the same sufficiently to maintain the pressure in said chamber.

18. In a continuous filter-press in combination, a longitudinal chamber comprising a filtering compartment, a packing compartment and a discharging compartment through which material is delivered in passing from said filtering compartment to said packing compartment, said discharging compartment having longitudinally arranged projections to check the rotation of the material passing therethrough, said filtering compartment having an inlet for the material to be filtered, a filtering medium within said compartment, means for creating a pressure in said chamber to thereby force filtrate through said filtering medium and leave a deposit of residuum thereon, means for continually carrying forward residuum deposited on said filtering medium to said packing compartment, said packing compartment being provided with means to restrict the movement of material therethrough and having an outlet opening provided with means to choke the same so that the residual material passing through said outlet will close the same sufficiently to maintain the pressure in said chamber.

19. In a continuous filter-press in combination, a longitudinal chamber comprising a filtering compartment and a washing compartment, said filtering compartment having an inlet for material to be filtered, a filtering medium within said compartment, means for creating a pressure in said filtering compartment to thereby force filtrate through said filtering medium and leave a deposit of residuum thereon, means for continually delivering residuum from said filtering compartment to said washing compartment, said washing compartment being formed with inlet openings at one side thereof and outlet openings at the other side thereof for the passing of a washing fluid therethrough, draining devices for the outlet openings of said washing compartment, and means for supplying a washing fluid to the inlet openings of said washing compartment.

20. In a continuous filter-press in combination, a longitudinal chamber comprising a filtering compartment and a washing compartment, said filtering compartment having an inlet for material to be filtered, a filtering medium within said compartment, means for creating a pressure in said filtering compartment to thereby force filtrate through said filtering medium and leave a deposit of residuum thereon, means for continually delivering residuum from said filtering compartment to said washing compartment, said washing compartment being formed with inlet openings at one side thereof and outlet openings at the other side thereof for the passing of a washing fluid therethrough, draining devices for the outlet openings of said washing compartment, and means for supplying a washing fluid to the inlet openings of said washing compartment, and means at each end of said washing compartment to check the longitudinal travel of residuum therethrough.

21. In a continuous filter-press in combination, a longitudinal chamber comprising a filtering compartment, a washing compartment, a discharging compartment and a packing compartment, said filtering compartment having an inlet for the material to be filtered, a filtering medium within said compartment, means for creating a pressure in said filtering compartment to thereby force filtrate through said filtering medium and leave a deposit of residuum thereon, means for continually delivering residuum deposited on said filtering medium to said washing compartment, and means in said discharging compartment for delivering the material from said washing compartment to said packing compartment at a slower rate than residual material is delivered from said filtering compartment to said washing compartment, said packing compartment being provided with means to restrict the movement of residual material therethrough and having an outlet opening provided with means to choke the same so that the residual material passing through said outlet will close the same sufficiently to maintain the pressure in said chamber.

22. In a continuous filter press, in combination, filtering means, washing means, and delivery means connected for continuous operation in the order named, means for moving the material to be operated upon through said aforementioned means, and means for causing the residuum to effect a fluid-tight separation of the washing means from the filtering and delivery means.

23. In a continuous filter press, in combination, filtering means comprising a filtering medium and means for passing the material to be filtered over said medium under pressure, said means being constructed to leave a deposit of residuum upon said medium to increase the filtering action of said means, means for effecting the removal of said residuum at desired intervals, and means for washing said residuum.

Signed at New York this 6" day of November 1913.

JOHN JOHNSON.

Witnesses:
 ABRAM BERNSTEIN,
 BEATRICE MIRVIS.